(12) United States Patent
Schunk et al.

(10) Patent No.: US 6,896,783 B2
(45) Date of Patent: May 24, 2005

(54) METHOD FOR PRODUCING MATERIAL LIBRARIES BY MEANS OF ELECTROCHEMICAL DEPOSITION

(75) Inventors: Stephan A. Schunk, Heidelberg (DE); Dirk Demuth, Mannheim (DE); Hartmut Hibst, Schriesheim (DE)

(73) Assignee: hte Aktiengesellschaft the high throughput experimentation company, Heidelberg (DE)

( * ) Notice: Subject to any disclaimer, the term of this patent is extended or adjusted under 35 U.S.C. 154(b) by 146 days.

(21) Appl. No.: 10/168,099

(22) PCT Filed: Dec. 12, 2000

(86) PCT No.: PCT/EP00/12601

§ 371 (c)(1),
(2), (4) Date: Dec. 2, 2002

(87) PCT Pub. No.: WO01/43866

PCT Pub. Date: Jun. 21, 2001

(65) Prior Publication Data

US 2003/0127335 A1 Jul. 10, 2003

(30) Foreign Application Priority Data

Dec. 13, 1999 (DE) .......................... 199 59 974

(51) Int. Cl.$^7$ .............................. C25D 5/00; B01J 19/00
(52) U.S. Cl. .......................... 205/81; 205/98; 205/104; 205/128; 205/151; 436/37; 436/147; 436/159
(58) Field of Search .......................... 205/81, 98, 104, 205/128, 151; 435/37, 147, 159

(56) References Cited

U.S. PATENT DOCUMENTS

| 4,099,923 | A | | 7/1978 | Milberger |
| 5,449,754 | A | | 9/1995 | Nishioka |
| 5,929,208 | A | | 7/1999 | Heller et al. |
| 6,187,164 | B1 | * | 2/2001 | Warren et al. ................ 205/81 |
| 6,468,410 | B1 | * | 10/2002 | Donne ........................ 205/81 |
| 6,468,806 | B1 | * | 10/2002 | McFarland et al. ......... 436/518 |

FOREIGN PATENT DOCUMENTS

| DE | 198 55 894 | 6/2000 |
| WO | WO 96/11878 | 4/1996 |
| WO | WO 97/32208 | 9/1997 |
| WO | WO 98/14641 | 4/1998 |
| WO | WO 99/19724 | 4/1999 |
| WO | WO 99/41005 | 8/1999 |

OTHER PUBLICATIONS

U. Landau: "Electrolytic Methods in Metallurgy," Schriftenr. GMB 1997, 81.
N. Kanami: Galvanotechnik 1998, 89 (10) 3267–3276.
H. Sanchez: J. Elektrochem. Soc. 1997, 144 (6), 2004–2012.
H. Natter: Ber. Bunsen–Ges. 1997, 101 (11), 1706–1713.
G. Ertl et al.: "Handbok of Heterogeneous Catalysis," Wiley–VCH, Weinheim 1997.

* cited by examiner

Primary Examiner—Roy King
Assistant Examiner—William T. Leader
(74) Attorney, Agent, or Firm—Jones Day

(57) ABSTRACT

The invention relates to a method for combinatorially producing a library of materials by means of an electrochemical deposition in an array. The inventive library is made from an array of containers that consist of an electroconductive material, are open to the top and are electroconductively connected to a shared current supply device and is made from a corresponding array of auxiliary electrodes that are electroconductively connected to a shared current supply device and are arranged in such a way that an auxiliary electrode plunges into a container respectively or can be introduced therein without touching said container. The inventive method comprises the following steps: filling the containers with electrolytes having different compositions and containing electrolytically separable elements and applying an electric voltage between the current supply devices of the containers and auxiliary electrodes for obtaining an electrolytic deposition on the surfaces of the containers.

16 Claims, No Drawings

METHOD FOR PRODUCING MATERIAL LIBRARIES BY MEANS OF ELECTROCHEMICAL DEPOSITION

The present invention relates to processes for combinatorial preparation of a material library by electrochemical deposition and to a process for combinatorial testing of these material libraries.

Preparation and testing in parallel of materials having suitable physical or chemical properties is an area of material research which is currently becoming of increasing importance.

DE-A 198 55 894 describes, for example, for combinatorial preparation and testing of catalysts, an array of heterogeneous catalysts built up from a body which has continuous parallel channels which contain different heterogeneous catalysts. To prepare these arrays processes are employed in which the channels, or auxiliary substrates situated in the channels, are coated with catalyst compositions or their precursors. Coating is preferably performed using introduction or application of solutions, emulsions or dispersions of elements or element compounds onto the channels or the auxiliary substrates.

This process for preparing catalyst libraries generally shows good results in the preparation of oxidic materials. However, in the preparation of coatings in the form of elements, the process described can have disadvantages, since for these, generally, additional reducing agents must be used. However, these can be in part chemically co-incorporated as an impurity in an unwanted manner into the deposited metals or alloys, such as when hypophosphorous acid or its salts are used.

An object was therefore to provide a process for the rapid preparation of large material libraries having defined materials, preferably in the elemental state, particularly preferably in the form of metals or alloys, which avoids the disadvantages described.

The object is achieved according to the invention by a process for combinatorial preparation of a material library by electrochemical deposition in an array which is formed of an array of open-top containers of electrically conducting material that are electrically connected to a shared power supply and a corresponding array of auxiliary electrodes which are electrically connected to a shared power supply and are disposed in such a manner that in each case one auxiliary electrode can be immersed in, or introduced into, a container without contacting it, comprising the following steps:

filling the containers with electrolytes of differing composition which contain electrolytically depositable elements and applying an electric voltage between the power supplies of the containers and auxiliary electrodes in order to cause electrolytic deposition on the surfaces of the containers.

The object is further achieved by a process for combinatorial preparation of a material library by electrochemical deposition in an array formed of an array of tubes made of electrically conducting material which are open at both ends and are electrically connected to a shared power supply, a corresponding array of auxiliary electrodes which are electrically connected to a shared power supply and are disposed in such a manner that in each case one auxiliary electrode can be immersed in or introduced into a tube without contacting it, and a corresponding array of auxiliary electrode containers made of electrically conducting material which are connected to a shared power supply and which each enclose one tube, in which case there is no contact between the tubes on the one hand and the auxiliary electrodes and auxiliary electrode containers on the other, which process comprises the following steps:

filling the auxiliary electrode containers with electrolytes of differing composition that contain electrolytically depositable elements, applying an electric voltage between the power supply of the tubes on the one hand and the power supplies of the auxiliary electrodes and auxiliary electrode containers on the other in order to cause electrolytic deposition on the surfaces of the tubes.

The term "array" designates here an arrangement of a plurality of containers, preferably from 5 to 1 000, particularly preferably from 10 to 200, containers. The geometric arrangement of the individual containers to one another can be chosen freely here. For example, the containers can be arranged within a row (quasi one-dimensional) or a chess board pattern (quasi two-dimensional). Preferably, they have defined spacings from one another.

The auxiliary electrodes and, if appropriate, auxiliary electrode containers have the same geometric arrangement as the containers or tubes.

The materials are prepared by electrochemical deposition.

It is precisely electrolytic deposition processes which offer a number of possibilities with which materials in the elemental state, such as metals and their alloys, can be deposited (see Landau, U., Schriftenr. GMB 1997, 81, Elektrolyseverfahren in der Metallurgie [Electrolytic methods in metallurgy], 29–52). Depending on the process, layers of differing thickness, morphology, texture and composition can be deposited (see Kanani, N., Galvanotechnik 1998, 89 (10) 3267–3276), which are approaches of interest especially with respect to the production of material libraries. In addition to simple chemical modifications of the electrolyte, for example varying the concentration and composition of the solution, or adding foreign salts (auxiliary electrolytes), targeted variations in current strength and voltage can lead to differing results with the deposited components. Variations of the abovementioned properties of the deposited materials can also be achieved for depositing mixtures of various components, for example metal alloys, using the techniques which are usual in pulsed electrolysis (Kanani, N., Galvanotechnik 1998, 89 (10) 3267–3276). In this method a variation with time in potential is utilized to deposit metals, not as is customary with conventional electrolysis processes, according to electrochemical series, but to achieve simultaneous deposition of different metal components as alloy (for example Sanchez, H., J. Elektrochem. Soc. 1997, 144 (6), 2004–2012; Natter, H., Ber. Bunsen-Ges. 1997, 101 (11), 1706–1713). The resultant compositions of the alloys can, in addition to the abovementioned electrolyte solution compositions or additional parameters, such as the use of auxiliary electrodes or flow of the electrolyte solution, also be controlled by the type of pulse sequence, that is parameters such as pulse strength; pulse length and pulse shape (Sanchez, H.; J. Electrochem. Soc. 1997, 144 (6), 2004–2012). It is just these parameters which make the pulsed electrolysis process a technique of interest for producing the material libraries, since by simple variation of electrolysis parameters other compositions of the product can be achieved. According to the invention, the auxiliary materials, procedures and pulse sequences described in the abovementioned literature can be used.

The containers consist of electrically conducting material, such as metal, C, SiC or Si. To increase the accessible surface area, in many cases, preferably porous materials are used. Preference is given to containers which are more greatly elongated in one dimension than in the other, such as tubes of any desired cross section. These are generally arranged vertically and closed at their lower tube ends during the subsequent electrolysis, in order to avoid spilling the charged solution. The closure can be made in such a manner that from the start a tube closed at one end is used as container, or alternatively a customary stopper made of a suitable material is used. After coating, the closed tube end is removed, for example by sawing, or the stopper used is removed again by unscrewing or pulling it out.

In order to coat the containers, preferably tubes according to one embodiment of the invention, not only on their interior facing the auxiliary electrode, but also on their exterior, the tubes are preferably placed in an auxiliary electrode container and the space between auxiliary electrode container and tube exterior is also filled with the solution to be electrolyzed. This also has the advantage that in the case of porous container materials, no solution can escape from the interior of the containers to the outside and thus be lost. In this case, the tubes used are open at both ends. In addition, auxiliary electrode containers are also connected electrically to one another and exposed to the same potential as the auxiliary electrodes introduced into the tubes to be coated. This is carried out in such a manner that the interior and exterior of the tubes are preferably coated with the same layer thickness and layer quality.

The electrolyte solution contains, in dissolved form, the elements which are to be deposited later, preferably in elemental form. The concentration and ratio of the elements used in the solution is matched to the composition of the alloy to be deposited. The elements to be deposited electrolytically are the generally usable metals and semimetals. Examples are Pd, Pt, Cu, Co, Ni, Fe, Cr, Cd, Zn, Ru, Ir, Ag, Au. Depending on the electrochemical potential, they can be used in water or organic solvents such as alcohols or DMSO.

The concentration of the salts or elements to be deposited dissolved in the electrolyte is in the customary range of dilute solutions up to the solubility limit. Counterions and additives are also chosen correspondingly. Generally, an aqueous electrolyte is employed. In addition, the solution, as is customary in electrochemical depositions, can contain a number of additional components or additives, for example complexing agents and/or supporting electrolytes, which serve for influencing the deposition rate in a suitable manner and for improving the deposited layer quality with respect to homogeneous composition, freedom from faults and surface smoothness, that is to say glossiness. They are described, for example, in the abovementioned literature. Preferably, the solutions are prepared in a substantially automated manner, for example on the basis of the processes described in DE-A 198 55 894.

Preferably, the electrolytes of differing composition are prepared in an automated manner by mixing predetermined amounts of solutions of the electrolytically depositable elements in one or more mixing vessels operated in parallel and subsequently transferring them into predetermined containers of the array.

The term "predetermined" means that, for example, a number of different electrolytes are introduced into the containers in such a manner that the assignment of the different electrolytes to the individual containers can be recorded and can be retrieved later, for example during determination of the properties of the deposited materials, in order to make possible unambiguous assignment of defined analytical results to defined material compositions. Preferably, the electrolyte solutions are prepared and distributed to the differing containers under computer control, with the respective composition of an electrolyte and position in the container being stored in the computer and being able to be retrieved later. The term "predetermined" thus serves for differentiation in comparison with chance or random distribution of the generally different electrolyte solutions among the differing containers.

Solutions of the electrolytically depositable elements can also be prepared in separate storage vessels. Then, predetermined amounts of the predetermined solutions are metered simultaneously or sequentially into the individual containers. In this procedure, the metering can be performed, for example, using an ink jet, and a corresponding process is described in WO 96/11878 or U.S. Pat. No. 5,449,754. Preparation can also be automated, for example, using an automated pipette or pipetting robot.

The apparatus which leads to all containers having a shared electrical contact is preferably constructed in such a manner that the electric fields occurring during the later electrolysis are substantially homogeneous with respect to their direction and strength and thus make possible uniform coating in all containers with respect to layer thickness and layer quality.

The auxiliary electrode is preferably constructed in such a manner that the electric fields occurring during the later electrolysis are substantially homogeneous with respect to their direction and strength and thus make possible uniform coating in all containers with respect to layer thickness and layer quality. In the coating of tubular containers, preferably rod-shaped or tubular electrodes are used.

For this purpose the containers, the auxiliary electrodes and the auxiliary electrode containers, and also the tubes, can have any suitable geometries. For example, a tubular container closed at one end having a circular cross section can have a rod-shaped or tubular auxiliary electrode standing at the center of the circle which extends up to the vicinity of the container bottom. The same applies with additional use of an auxiliary electrode container. For this, a tubular auxiliary electrode container which is closed at one end, a tube having a circular cross section and the auxiliary electrode can be arranged concentrically. The distances between the auxiliary electrode, the tube or container and the auxiliary electrode container are preferably chosen here in such a manner that at all points after charging the electrolyte, the same potential differences exist.

A combination of auxiliary electrode and auxiliary electrode container can also be made up in such a manner that a tube closed at one end is used as auxiliary electrode container, in which case the auxiliary electrode is fixed centered on the tube bottom of the auxiliary electrode container in an electrically conducting manner and extends centrally into the container. In the space between centered auxiliary electrode and auxiliary electrode container, the tube is then arranged, for example suspended.

Preferably, the auxiliary electrode and the auxiliary electrode container have the same potential, that is to say the arrays of auxiliary electrodes and auxiliary electrode containers have a shared power supply.

The entire array for electrochemical deposition thus has a multiplicity of electrolysis cells connected in parallel. It is also possible according to the invention to connect in series in each case a plurality of electrolysis cells, with these rows of electrolysis cells then each being connected in parallel. However, preferably, all electrolysis cells are connected in parallel. It is also possible not to connect all of the auxiliary electrodes or all of the containers in such a manner and bring them to a potential, but subquantities of the auxiliary electrodes or containers can also be brought to a potential. It is then possible, for example, to deposit a multiplicity of different electrolyte solutions at different potential differences in order to be able to compare the resultant materials with one another.

Since in the inventive process, preferably, libraries of materials are to be deposited in their elemental form, that is to say in particular metals and alloys, the applied potential, that is to say the applied voltage, is preferably applied so that the containers form the cathode and the auxiliary electrode acts as anode. In some cases it is expedient to use sacrificial anodes as anode. In certain cases, using the inventive process, non-elemental substances, for example oxides, may also be electrolytically deposited. In this case the containers are connected as anode and the auxiliary electrode correspondingly as cathode. The applied potential is, in accordance with the Nernst equation, dependent on which elements are to be deposited in what concentration over the electrolysis time. Generally, the applied potential is constant over time. In the deposition of alloys, the pulse plating process (pulsed electrolysis), particularly, has proven itself, in which an electric voltage varying over time is applied to the electrodes. In the pulsed electrolysis processes mentioned, it is not a continuous current flow into the electrolysis cell which is switched over, but a potential gradient in time which is applied to the cell as a periodic rectangular, sinusoidal or other type of pulse. By this technique it is also possible to deposit multicomponent alloys simultaneously. By varying the pulse parameters, such as pulse length, pulse width, reverse pulse, superimposition of pulse sequences, it is possible to control the composition of deposited alloys and other factors such as surface morphology or grain structure. Here, preferably, a procedure is followed as described in the abovementioned literature.

The present invention also relates to a process for the combinatorial testing of material libraries which are obtained according to the above described processes in which (1) when containers are presented, these are transferred to tubes open at both ends and the tubes are introduced as catalysts into different channels of a body which has a multiplicity of continuous parallel channels,
(2) if appropriate activation of the catalysts in the body,
(3) heating/cooling the body to a desired reaction temperature,
(4) passing a fluid reactant or a fluid reaction mixture through channels of the body,
(5) discharge of the reacted fluids from individual or a plurality of combined channels of the body,
(6) analysis of the discharged reacted fluids,
(7) if appropriate comparative evaluation of the analytical results of a plurality of analyses.

In this case, after heating/cooling the body to a first reaction temperature in step (3), the steps (4) to (7) can be carried out successively for a plurality of different fluid reactants or fluid reaction mixtures, where in each case a purge step with a purge gas can be introduced, and then the body can be heated/cooled to a second reaction temperature and the preceding reactions can be repeated at this temperature.

The terms "body" and "channel" are as defined in DE-A-198 55 894. The body can be, for example, a tube-bundle reactor or heat exchanger having a multiplicity of tubes parallel to one another. However, the body can also be a block made of a solid material which has the channels in the form of bore holes. Suitable geometries are also described in DE-A-198 55 894.

Reactions or conversions suitable for the analysis are described, for example, in G. Ertl, H. Knözinger, J. Weitkamp, Editors "Handbook of Heterogeneous Catalysis", Wiley-VCH, Weinheim 1997. Examples of suitable reactions are listed in particular in this reference in volumes 4 and 5 under the numbers 1, 2, 3 and 4.

Examples of suitable reactions are also listed in DE-A 198 55 894. In particular the inventively prepared materials are catalysts for the decomposition of nitrogen oxides, ammonia synthesis, ammonia oxidation, oxidation of hydrogen sulfide to sulfur, oxidation of sulfur dioxide, direct synthesis of methyl chlorosilanes, oil refining, oxidative coupling of methane, methanol synthesis, hydrogenation of carbon monoxide and carbon dioxide, conversion of methanol into hydrocarbons, catalytic reforming, catalytic cracking and hydrocracking, coal gasification and liquefaction, fuel cells, heterogeneous photocatalysis, synthesis of MTBE and TAME, isomerizations, alkylations, aromatizations, dehydrogenations, hydrogenations, hydroformylations, selective or partial oxidations, aminations, halogenations, nucleophilic aromatic substitutions, addition and elimination reactions, oligomerizations and metathesis, polymerizations, enantioselective catalysis and biocatalytic reactions.

The materials/catalysts in the body having the channels are preferably tested by reaction of fluid reactants or reaction mixtures which are generally in the liquid, or preferably gaseous, state. In this case, reaction gas mixtures are passed through the tubes at a preset temperature, the gas mixture generally flowing simultaneously through all tubes.

The individual reaction gases can be passed out of the body via an apparatus which is mounted essentially gastightly onto the tube-bundle reactor, with the individual reaction gases of individual reaction tubes, a plurality of reaction tubes or all reaction tubes, being passed out separately and then being analyzed separately via a switching valve. Another way of passing out separately the individual off-gases of the respective generally differently-coated reaction tubes, is, for example, a computer-controlled mechanically moved "sniffing apparatus" having a sniffer line for the gas to be removed which is positioned essentially automatically on, in, or above the outlet of the respective reaction tube and then takes off a reaction gas sample.

The catalytic performance of individual catalytic coatings of the individual reaction tubes can be screened by chemical analysis of the respective gas streams using suitable methods known per se. Sampling and analysis of the reaction gases are also described in DE-A-198 55 894.

The inventive method permits the preparation of large material libraries having defined, preferably metallic materials, which are not accessible in this manner by other processes.

The invention also relates to the above described arrays.

What is claimed is:

1. A process for combinatorial preparation of a material library by electrochemical deposition in an array which is formed of an array of open-top containers of electrically conducting material that are electrically connected to a shared power supply and a corresponding array of auxiliary electrodes which are electrically connected to a shared power supply and are disposed in such a manner that in each case one auxiliary electrode can be immersed in, or introduced into, a container without contacting it, comprising the following steps:

filling the containers with electrolytes of differing composition which contain electrolytically depositable elements and applying an electric voltage between the power supplies of the containers and auxiliary electrodes in order to cause electrolytic deposition on the surfaces of the containers.

2. The process as claimed in claim 1, characterized in that pulsed electrolysis is used.

3. The process as claimed in claim 2, characterized in that the electrolytes of differing composition are prepared in an automated manner by mixing predetermined amounts of solutions of the electrolytically depositable elements in one or more mixing vessels operated in parallel and subsequently transferring them into the containers of the array.

4. The process as claimed in claim 2, characterized in that the electrolytes of differing composition are prepared in an automated manner by preparing solutions of the electrolytically depositable elements in separate storage vessels and simultaneously or sequentially metering predetermined amounts of the predetermined solutions into the individual containers.

5. A process for the combinatorial testing of material libraries which are obtained according to a process as claimed in claim 2, in which
 (1) when containers are presented, these are transferred to tubes open at both ends and the tubes are introduced as catalysts into different channels of a body which has a multiplicity of continuous parallel channels,
 (2) if appropriate activation of the catalysts in the body,
 (3) heating/cooling the body to a desired reaction temperature,
 (4) passing a fluid reactant or a fluid reaction mixture through channels of the body,
 (5) discharge of the reacted fluids from individual or a plurality of combined channels of the body,
 (6) analysis of the discharged reacted fluids,
 (7) if appropriate comparative evaluation of the analytical results of a plurality of analyses.

6. The process as claimed in claim 1, characterized in that the electrolytes of differing composition are prepared in an automated manner by mixing predetermined amounts of solutions of the electrolytically depositable elements in one or more mixing vessels operated in parallel and subsequently transferring them into the containers of the array.

7. A process for the combinatorial testing of material libraries which are obtained according to a process as claimed in claim 6, in which
 (1) when containers are presented, these are transferred to tubes open at both ends and the tubes are introduced as catalysts into different channels of a body which has a multiplicity of continuous parallel channels,
 (2) if appropriate activation of the catalysts in the body,
 (3) heating/cooling the body to a desired reaction temperature,
 (4) passing a fluid reactant or a fluid reaction mixture through channels of the body,
 (5) discharge of the reacted fluids from individual or a plurality of combined channels of the body,
 (6) analysis of the discharged reacted fluids,
 (7) if appropriate comparative evaluation of the analytical results of a plurality of analyses.

8. The process as claimed in claim 1, characterized in that the electrolytes of differing composition are prepared in an automated manner by preparing solutions of the electrolytically depositable elements in separate storage vessels and simultaneously or sequentially metering predetermined amounts of the predetermined solutions into the individual containers.

9. A process for the combinatorial testing of material libraries which are obtained according to a process as claimed in claim 8, in which
 (1) when containers are presented, these are transferred to tubes open at both ends and the tubes are introduced as catalysts into different channels of a body which has a multiplicity of continuous parallel channels,
 (2) if appropriate activation of the catalysts in the body,
 (3) heating/cooling the body to a desired reaction temperature,
 (4) passing a fluid reactant or a fluid reaction mixture through channels of the body,
 (5) discharge of the reacted fluids from individual or a plurality of combined channels of the body,
 (6) analysis of the discharged reacted fluids,
 (7) if appropriate comparative evaluation of the analytical results of a plurality of analyses.

10. A process for the combinatorial testing of material libraries which are obtained according to a process as claimed in claim 1, in which
 (1) when containers are presented, these are transferred to tubes open at both ends and the tubes are introduced as catalysts into different channels of a body which has a multiplicity of continuous parallel channels,
 (2) if appropriate activation of the catalysts in the body,
 (3) heating/cooling the body to a desired reaction temperature,
 (4) passing a fluid reactant or a fluid reaction mixture through channels of the body,
 (5) discharge of the reacted fluids from individual or a plurality of combined channels of the body,
 (6) analysis of the discharged reacted fluids,
 (7) if appropriate comparative evaluation of the analytical results of a plurality of analyses.

11. The process as claimed in claim 10, characterized in that, after heating/cooling the body to a first reaction temperature in step (3), the steps (4) to (7) are carried out successively for a plurality of different fluid reactants or fluid reaction mixtures, where in each case a purge step with a purge gas can be introduced, and then the body can be heated/cooled to a second reaction temperature and the preceding reactions can be repeated at this temperature.

12. A process for combinatorial preparation of a material library by electrochemical deposition in an array formed of an array of tubes made of electrically conducting material which are open at both ends and are electrically connected to a shared power supply, a corresponding array of auxiliary electrodes which are electrically connected to a shared power supply and are disposed in such a manner that in each case one auxiliary electrode can be immersed in or introduced into a tube without contacting it, and a corresponding array of auxiliary electrode containers made of electrically conducting material which are connected to a shared power supply and which each enclose one tube, in which case there is no contact between the tubes on the one hand and the auxiliary electrodes and auxiliary electrode containers on the other, which process comprises the following steps:
 filling the auxiliary electrode containers with electrolytes of differing composition that contain electrolytically depositable elements,
 applying an electric voltage between the power supply of the tubes on the one hand and the power supplies of the auxiliary electrodes and auxiliary electrode containers on the other in order to cause electrolytic deposition on the surfaces of the tubes.

13. The process as claimed in claim 12, characterized in that pulsed electrolysis is used.

14. The process as claimed in claim 12, characterized in that the electrolytes of differing composition are prepared in an automated manner by mixing predetermined amounts of solutions of the electrolytically depositable elements in one or more mixing vessels operated in parallel and subsequently transferring them into the containers of the array.

15. The process as claimed in claim 12, characterized in that the electrolytes of differing composition are prepared in an automated manner by preparing solutions of the electrolytically depositable elements in separate storage vessels and simultaneously or sequentially metering predetermined amounts of the predetermined solutions into the individual containers.

16. A process for the combinatorial testing of material libraries which are obtained according to a process as claimed in claim 12, in which (1) when containers are presented, these are transferred to tubes open at both ends and the tubes are introduced as catalysts into different channels of a body which has a multiplicity of continuous parallel channels, (2) if appropriate activation of the catalysts in the body, (3) heating/cooling the body to a desired reaction temperature, (4) passing a fluid reactant or a fluid reaction mixture through channels of the body, (5) discharge of the reacted fluids from individual or a plurality of combined channels of the body, (6) analysis of the discharged reacted fluids, (7) if appropriate comparative evaluation of the analytical results of a plurality of analyses.

* * * * *